United States Patent
Bonk

(10) Patent No.: US 6,971,720 B2
(45) Date of Patent: Dec. 6, 2005

(54) SIMPLIFIED LINEAR RECLINER HAVING A FIXED PAWL

(75) Inventor: Jeffery T. Bonk, Clinton Township, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 0 days.

(21) Appl. No.: 10/614,541

(22) Filed: Jul. 7, 2003

(65) Prior Publication Data

US 2004/0021356 A1 Feb. 5, 2004

Related U.S. Application Data

(62) Division of application No. 09/748,482, filed on Dec. 27, 2000, now Pat. No. 6,655,741.

(51) Int. Cl.[7] ............................................. B60N 2/23
(52) U.S. Cl. .................... 297/362.14; 297/375; 188/67
(58) Field of Search .................. 297/362.12, 362.14, 297/368, 369, 370, 375; 188/67; 74/535, 74/569, 577 M, 527, 531, 575, 578

(56) References Cited

U.S. PATENT DOCUMENTS

| | | | | |
|---|---|---|---|---|
| 535,999 A | * | 3/1895 | Sargent | 297/81 |
| 1,821,298 A | * | 9/1931 | Ferreira | 297/370 |
| 4,007,815 A | * | 2/1977 | Acre | 188/265 |
| 4,865,386 A | * | 9/1989 | Detloff et al. | 297/375 |
| 5,344,215 A | | 9/1994 | Dahlbacka | |
| 5,618,083 A | | 4/1997 | Martone et al. | |
| 5,871,259 A | * | 2/1999 | Gehart | 297/362.12 |
| 6,155,644 A | * | 12/2000 | Rogala | 297/367 |

FOREIGN PATENT DOCUMENTS

| | | | | |
|---|---|---|---|---|
| CH | 155725 | * | 9/1932 | 297/375 |
| CH | 366461 | * | 2/1963 | 297/359 |

* cited by examiner

*Primary Examiner*—Peter R. Brown
(74) *Attorney, Agent, or Firm*—Harness, Dickey & Pierce, P.L.C.

(57) ABSTRACT

A linear recliner assembly is provided having a recliner rod slidably supported within a housing. The recliner rod is selectively engageable with a pawl which is fixed within the housing. The recliner rod is in contact with a cam which is operable to force the recliner rod into engagement with the pawl or enable the recliner rod to fall out of engagement with he pawl. The cam is biased in a first position by a biasing mechanism, such that the recliner rod is engaged with the pawl. The linear recliner assembly is implemented into a seat assembly for enabling an operator to select a plurality of recline positions of a seat back relative to a seat.

8 Claims, 5 Drawing Sheets

SIMPLIFIED LINEAR RECLINER HAVING A FIXED PAWL

CROSS-REFERENCE TO RELATED APPLICATIONS

This application is a divisional of U.S. patent application Ser. No. 09/748,482 filed on Dec. 27, 2000 U.S. Pat. No. 6,655,741. The disclosure of the above application is incorporated herein by reference.

FIELD OF THE INVENTION

The present invention relates to linear recliner assemblies and more particularly to a linear recliner assembly having a fixed pawl.

BACKGROUND OF THE INVENTION

Occupant safety and comfort are paramount concerns for automobile manufacturers. In particular, vehicle seating systems are a significant focus for improved comfort and safety. Conventional vehicle seating systems include reclining seats that enable comfort adjustment by a vehicle occupant.

In reclining seats, a recliner assembly is mounted to a long lever arm, namely the seat back, against which various forces are applied. The recliner assembly in a vehicle seat is quite small when compared with the length of a seatback, and vehicle vibration or movement of an occupant may impose various forces upon that lever arm during use. Because these forces are applied along such a lengthy lever arm, they can impose a large moment about the recliner assembly's pivot point potentially overcoming the capability of the assembly to anchor the seatback.

In addition, any imperfections in the components of the recliner assembly, such as play or backlash between the engaging teeth or tolerances in the assembly components, may allow the seatback to move a miniscule amount even when the assembly is locked. These small excursions are magnified by the length of the lever arm and become noticeable at the upper end of the seatback. For example, the seatback of an unoccupied seat may tend to oscillate when the vehicle encounters rough road conditions. This magnified play in a recliner assembly has been termed "chucking" and refers to any imperfection or play in the assembly components that allows movement of the lever arm or seatback while the assembly is in a locked condition.

Therefore, it is desirable in the industry to provide a recliner assembly that significantly reduces or eliminates chucking of a seat assembly. It is further desirable that such a recliner assembly be sufficiently strong, providing adequate occupant protection in the event of an accident.

It is also desirable in the industry to reduce the overall complexity of traditional reclining assemblies while maintaining operation and safety standards. In this manner, overall cost is reduced through implementation of fewer components and improved manufacturability. Additionally, a weight savings can be achieved through the utilization of fewer components in the reclining assembly.

SUMMARY OF THE INVENTION

Accordingly, a simplified linear recliner assembly according to the present invention overcomes the above described deficiencies of present linear recliner assemblies. Specifically, the linear recliner assembly of the present invention includes fewer components and a less complex overall design than previous linear recliner assemblies.

The linear recliner assembly of the present invention includes a housing, a recliner rod slidably supported within the housing, a pawl supported by the housing, and a cam rotatably supported by the housing. The cam has a cam surface that slidably interfaces the recliner rod. The cam is rotatable for selectively engaging the recliner rod with the pawl such that the recliner rod is prohibited from linear movement when engaged with the pawl. Preferably, the cam is biased in a first direction of rotation to force the recliner rod into engagement with the pawl. The cam is rotatable against the biasing force to disengage the recliner rod from the pawl for linear adjustment of the recliner rod relative to the housing.

Some advantages of the linear recliner assembly of the present invention include improvements in cost, weight and manufacturability of the linear recliner assembly.

A further advantage of the present invention is a simple, compact construction that reduces tolerance stack-up that would otherwise result in significant seat back chucking.

Additionally, packaging and trim of the overall seat assembly is more easily achieved because the recliner assembly's moving parts are internal to the compact housing.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
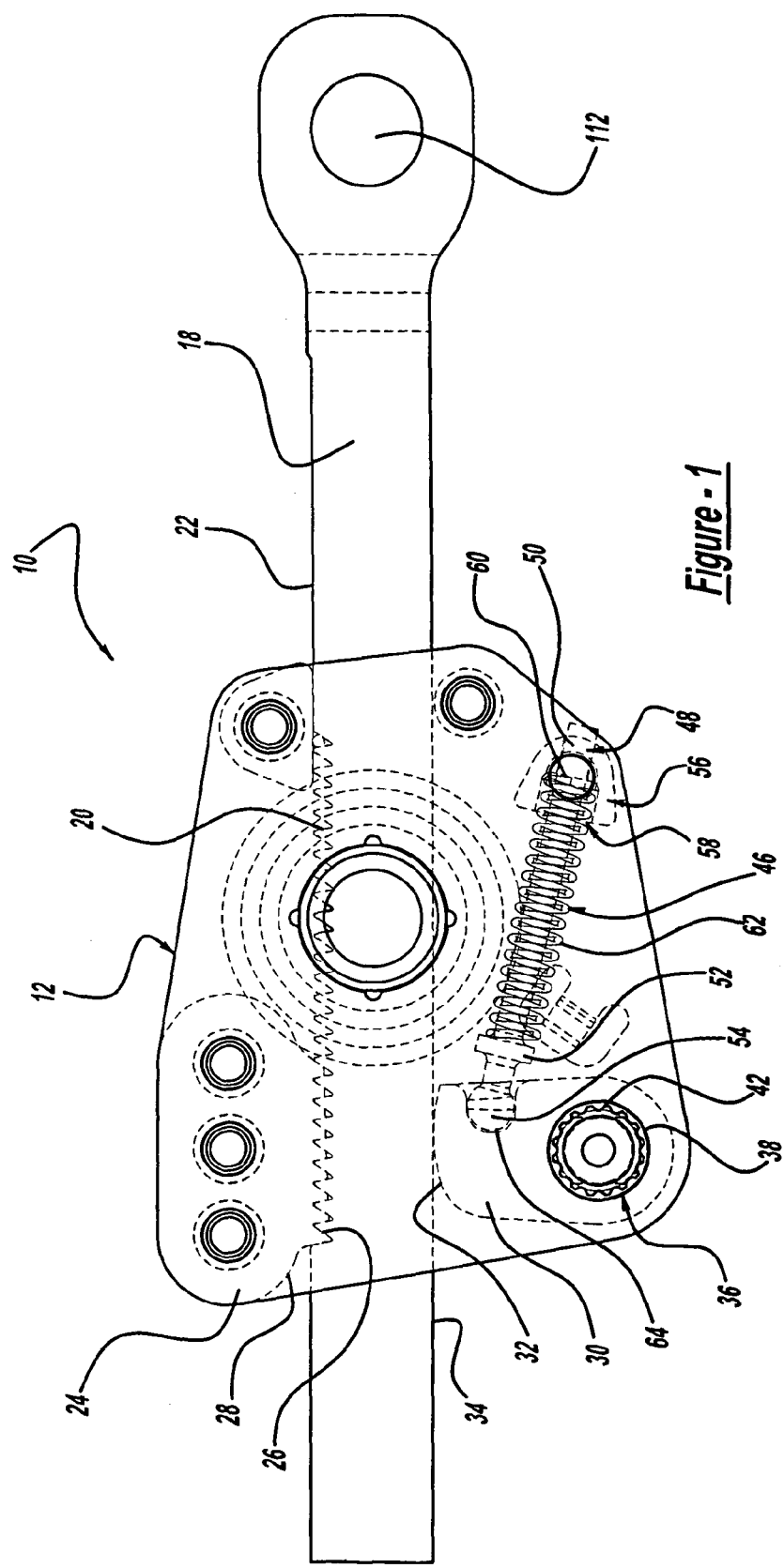
FIG. 1 is a side view detailing components of a linear recliner assembly according to the present invention.
Figure 2:
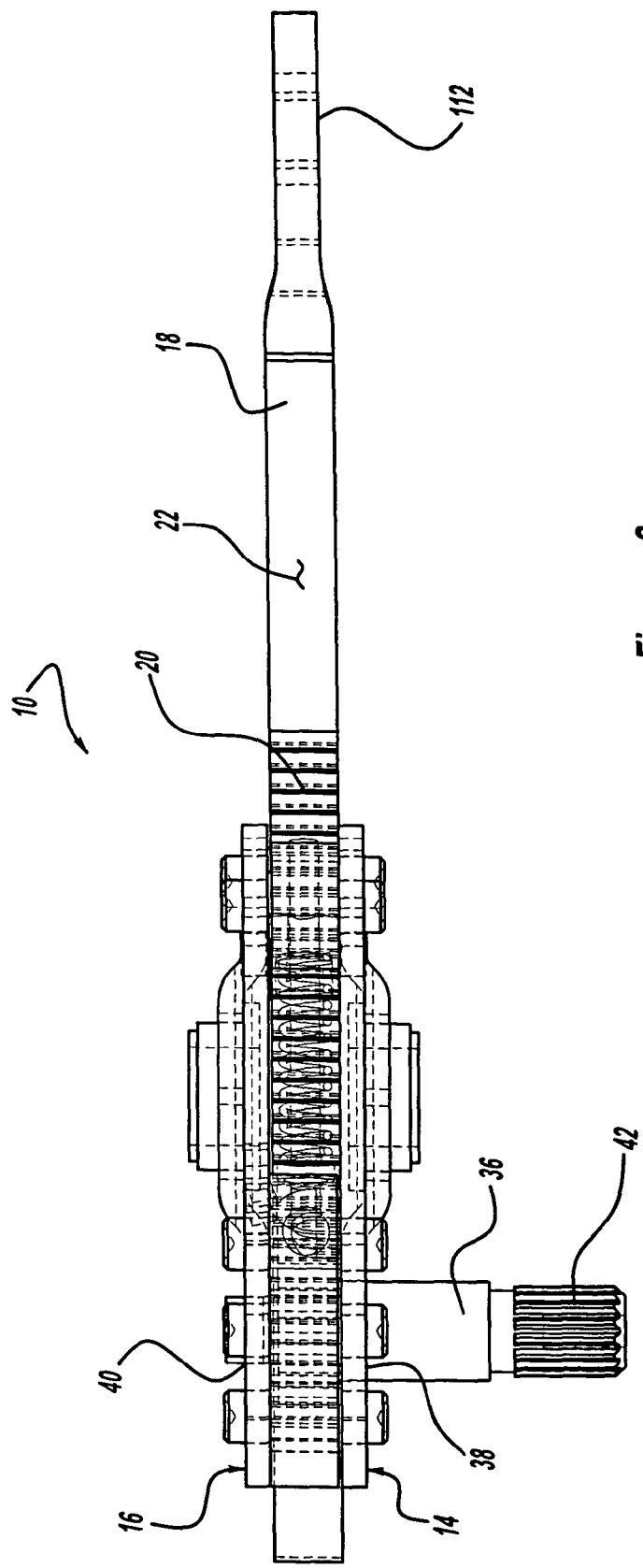
FIG. 2 is a top view of the linear recliner assembly of FIG. 1.
Figure 3:
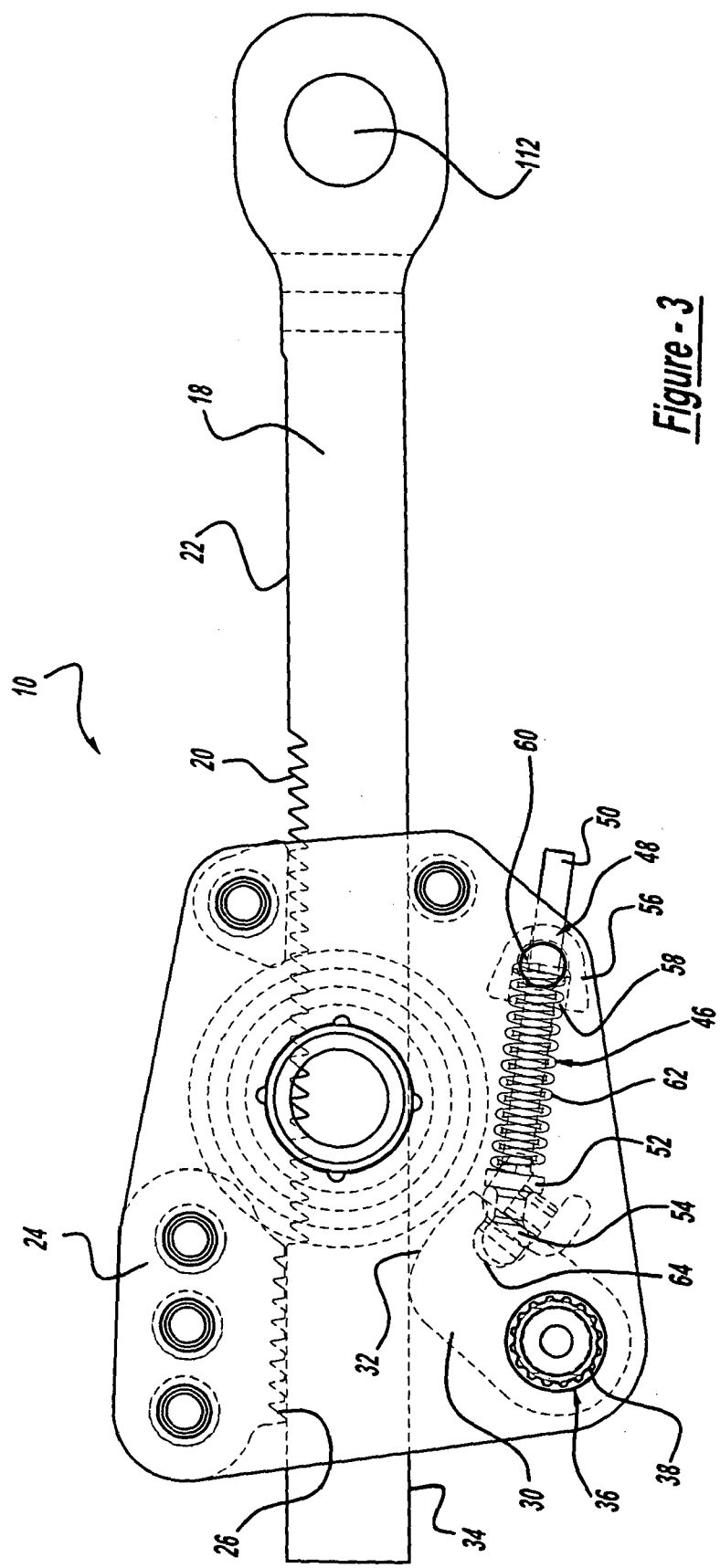
FIG. 3 is a side view of the linear recliner assembly of FIG. 1, showing the linear recliner assembly is a disengaged state.

With reference to FIGS. 1 through 3, a preferred embodiment of a linear recliner assembly 10 will be described in detail. The linear recliner assembly 10 includes a housing 12 that includes a first support plate 14 and a second support plate 16. A recliner rod 18 is slidably supported within the housing 12 and includes a toothed rack 20 formed in a top face 22. A pawl 24 is supported within the housing 12 and has a tooth portion 26 on a surface 28 facing the toothed rack 20 of the reclining rod 18. The pawl 24 is fixed between the first and second support plates 14,16 to prohibit pivoting or other movement relative to the housing 12. A cam 30 is rotatably supported between the first and second support plates 14,16 and has a cammed surface 32 that contacts a bottom face 34 of the recliner rod 18. The cam 30 is fixed for rotation with a spindle 36, which is rotatably supported by the first and second support plates 14,16 through respective openings 38,40. The spindle 36 includes a splined portion 42 at a distal end, to which a handle or lever 44 may be attached (see FIG. 5).

The cam 30 is rotatable between a first and second position. In a first position, the cam 30 forces the recliner rod 18 into engagement with the pawl 24. Specifically, the cam 30 pushes against the bottom surface 34 of the recliner rod 18 to force the toothed rack 20 of the recliner rod 18 and the tooth portion 26 of the pawl 24 to engage. In this position, the recliner rod 18 is prohibited from linear movement relative to the housing 12. The cam 30 is rotatable to a second position wherein the recliner rod 18 disengages the pawl 24. In this position, the recliner rod is free to move linearly relative to the housing 12.

Figure 5:
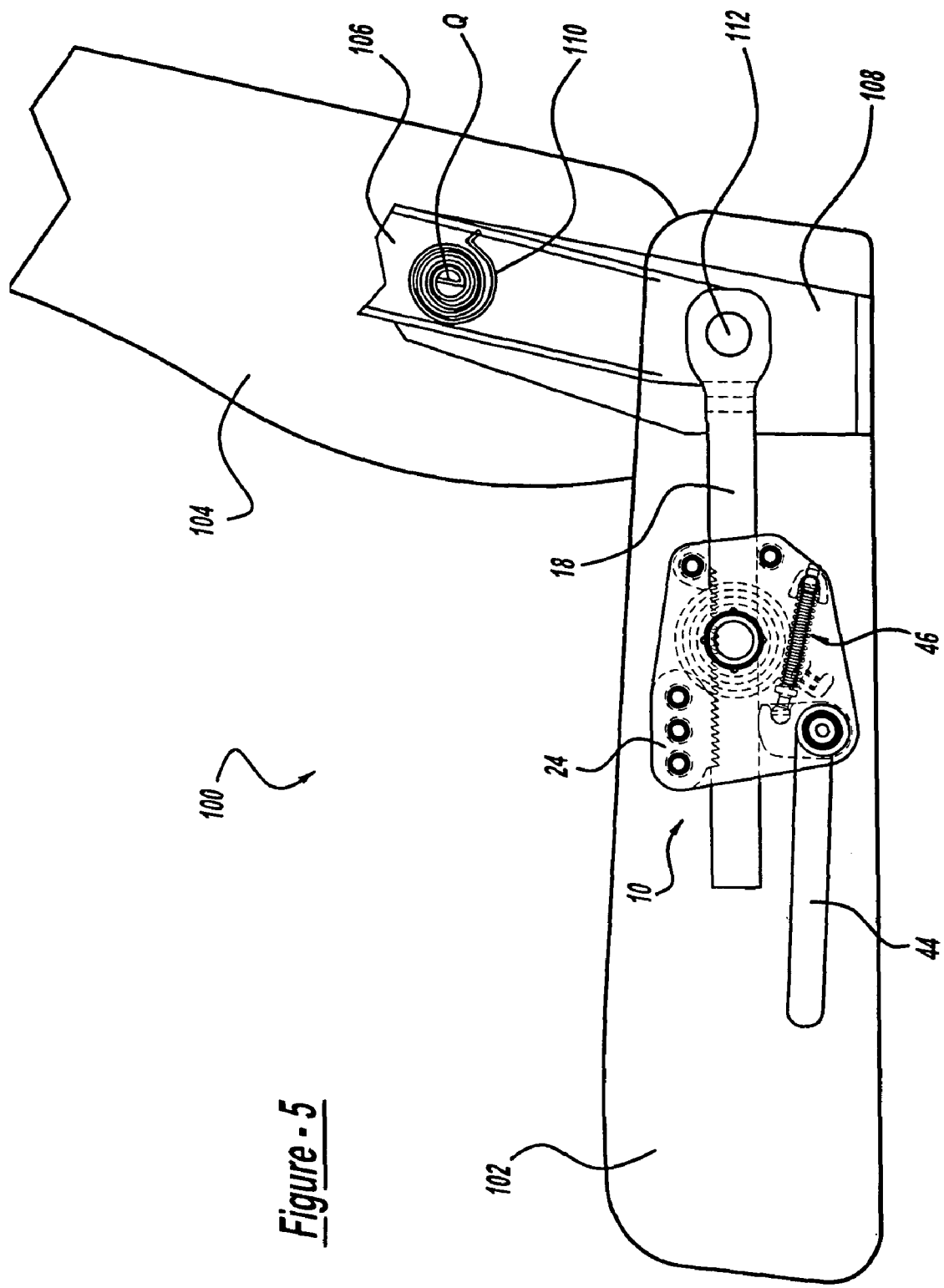
FIG. 5 is a schematic view of a seat assembly implementing the linear recliner assembly of the present invention.

Preferably the recliner rod 18 remains in the engaged position until an operator disengages the recliner rod 18 in order to adjust a respective seat assembly (see FIG. 5). Accordingly, the cam 30 is preferably biased in the first position by a biasing mechanism 46. In a first preferred embodiment, the biasing mechanism 46 includes a biasing rod 48 that includes a cylindrical portion 50, a collar 52 disposed intermediately along the cylindrical portion 50, and a ball 54 formed at distal end of the cylindrical portion 50. The biasing rod 48 is slidably supported within a guide bracket 56, which is supported by the housing 12. The guide bracket 56 includes a seat area 58 and an opening 60 through which the cylindrical portion 50 of the biasing rod 48 is disposed. A biasing spring 62 is disposed about the cylindrical portion 50 between the collar 52 and the seat area 58 of the guide bracket 56. The biasing spring 62 biases the biasing rod 48 away from the guide bracket 56. The ball 54 of the biasing rod 48 seats within a socket 64 of the cam 30. The relationship between the ball 54 and socket 64 interface of the biasing rod 48 and cam 30 is similar to that of a conventional ball and socket joint. As best seen if FIG. 1, the biasing mechanism 46 holds the cam 30 in the first position wherein the recliner rod 18 is engaged with the pawl 24.

To disengage the recliner rod 18 from the pawl 24, an operator rotates the spindle 36, and thus the cam 30, against the biasing force of the biasing mechanism 46. The rotation of the cam 30 causes the biasing rod 48 to be pushed toward and/or through the guide bracket 56, thereby compressing the biasing spring 62, which is seated between the collar 52 and the seat area 58 of the guide bracket 56. Additionally, as the cam 30 rotates to the second position, the ball 54 of the biasing rod rotates within the socket 64 of the cam 30. As best seen in FIG. 2, when the cam 30 is sufficiently rotated against the biasing force of the biasing mechanism 46, the recliner rod 18 is free to fall out of engagement with the pawl 24 and the recliner rod 18 may move linearly with respect to the housing 12. In this manner, the recliner rod 18 can be linearly adjusted with respect to the housing 12.

Figure 4:
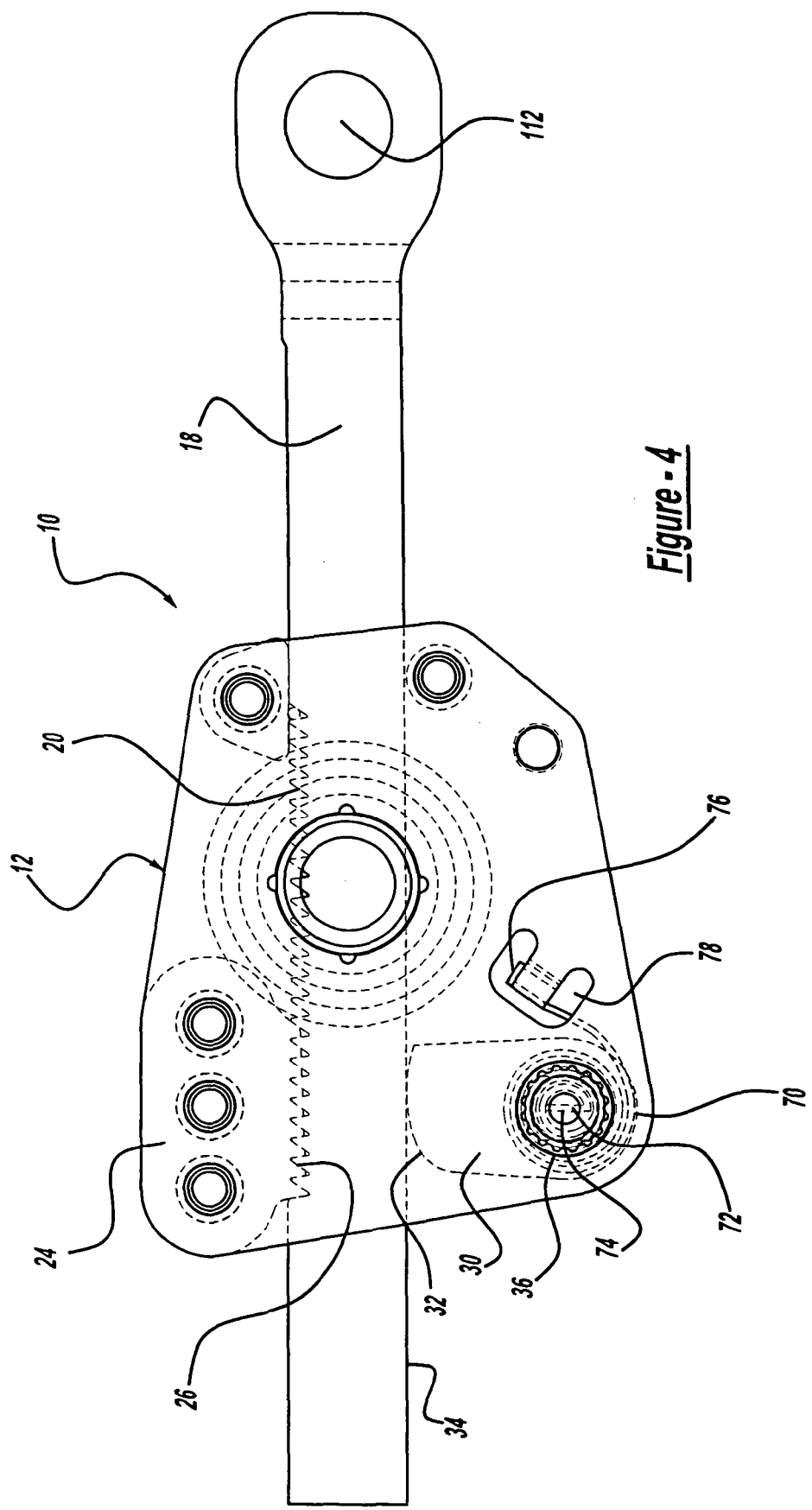
FIG. 4 is a side view detailing components of a second preferred embodiment of the linear recliner assembly.

With particular reference to FIG. 4, a second preferred embodiment of the linear recliner assembly 10 will be described in detail. It should be noted that the second preferred embodiment includes essentially the same components as the first preferred embodiment and, therefore, like reference numerals will be used to identify identical components.

In the second preferred embodiment, the linear recliner assembly 10 includes a coil spring 70 for biasing the spindle 36 in a first rotational direction, such that the cam 30 acts upon the recliner rod 18 to engage the recliner rod 18 with the pawl 24. The coil spring 70 includes a first end 72 that is received in a slot 74 of the spindle 36'. The coil spring 70 is disposed about the spindle 36' and further includes a second end 76 that is held by a bracket 78 formed within the housing 12.

To disengage the recliner rod 18 from the pawl 24, the cam 30 is rotated in a second rotational direction, against the biasing force of the coil spring 70. When the cam 30 is sufficiently rotated, the recliner rod 18 disengages the pawl 24, whereby the recliner rod 18 may move linearly with respect to the housing 12. In this manner, the recliner rod 18 can be linearly adjusted with respect to the housing 12.

With particular reference to FIG. 5 a seat assembly 100 implementing the linear recliner assembly 10 will be described in detail. It should be noted that either the first or second preferred embodiment of the linear recliner assembly 10 can be implemented in the seat assembly 100. The seat assembly 100 generally includes a seat 102 and a seat back 104 that is pivotal relative to the seat 102. A support arm 106 is disposed within the seat back for supporting the seat back 104 relative to the seat 102. The support arm 106 is pivotally attached to a support bracket 108 about an axis Q. A coil spring 110 is disposed about axis Q for biasing the support arm 106 in a first rotational direction relative to the support bracket 108. The recliner rod 18 includes an attachment point 112 for pivotally attaching the recliner rod 18 to an end of the support arm 106. As the recliner rod 18 is caused to move linearly with respect to the housing 12, the linear motion of the recliner rod 18 translates into pivotal motion of the support arm 106 about the axis Q. In this manner, an operator is able to select a desired recline position of the seat back 104 relative to the seat 102. Further, the coil 110 preferably biases the support arm 106, and thus the seat back 104, toward the seat 102. Thus, when the recliner rod 18 is disengaged from the pawl 24, the seat back 104 rotates toward the seat 102, absent any opposing force such as a seated occupant.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A linear recliner assembly comprising:
   a housing;
   a pawl nonmovably fixed to said housing;
   a recliner rod slidably supported by said housing and operable to selectively engage said pawl; and
   a cam rotatably supported by said housing and movable between a first position forcing said recliner rod into engagement with said pawl and a second position enabling said recliner rod to fall from engagement with said pawl, said cam biased into said first position by a biasing mechanism including a rod slidably supported within said housing, biased by a spring, and in pivotal engagement with said cam.

2. The linear recliner assembly of claim 1 further comprising:
   a first plurality of teeth formed in a lower surface of said pawl; and
   a second plurality of teeth formed in an upper surface of said recliner rod, said first and second pluralities of teeth selectively engaged to prohibit relative movement between said recliner rod and said pawl.

3. A reclining seat assembly including a seat and a seat back in pivotal relationship to the seat, said reclining assembly further comprising:
   a linear recliner assembly including:
      a housing;
      a pawl nonmovably fixed to said housing;
      a recliner rod pivotally engaged with the seat back and slidably supported by said housing, said recliner rod selectively engaging said pawl; and
      a cam rotatably supported by said housing and movable between a first position forcing said recliner rod into engagement with said pawl and a second position enabling said recliner rod to fall from engagement with said pawl, said cam biased into said first position by a biasing mechanism including a rod slidably supported within said housing, biased by a spring, and in pivotal engagement with said cam; and
   a handle fixed for rotation with said cam to rotate said cam between said first and second positions.

4. The reclining seat assembly of claim 3 further comprising:
   a first plurality of teeth formed in a lower surface of said pawl; and
   a second plurality of teeth formed in an upper surface of said recliner rod, said first and second pluralities of teeth selectively engaged to prohibit relative movement between said recliner rod and said pawl.

5. A linear recliner assembly comprising:
   a housing;
   a pawl nonmovably fixed to said housing;
   a recliner rod slidably supported by said housing and movable between an engaged position and a disengaged position; and
   a single cam rotatably supported by said housing and movable between a first position forcing said recliner rod into said engaged position and a second position allowing said recliner rod to fall into said disengaged position, said cam locking said recliner rod in said engaged position and supporting said recliner rod in said disengaged position, said cam biased into said first position by a biasing mechanism including a rod slidably supported within said housing, biased by a spring, and in pivotal engagement with said cam.

6. The linear recliner assembly of claim 5 further comprising:
   a first plurality of teeth formed in a lower surface of said pawl; and
   a second plurality of teeth formed in an upper surface of said recliner rod, said first and second pluralities of teeth selectively engaged to prohibit relative movement between said recliner rod and said pawl.

7. A reclining seat assembly including a seat and a seat back in pivotal relationship to the seat, said reclining assembly further comprising:
   a linear recliner assembly including:
      a housing;
      a pawl nonmovably fixed to said housing;
      a recliner rod slidably supported by said housing and movable between an engaged position and a disengaged position; and
      a single cam rotatably supported by said housing and movable between a first position forcing said recliner rod into said engaged position and a second position allowing said recliner rod to fall into said disengaged position, said cam locking said recliner rod in said engaged position and supporting said recliner rod in said disengaged position, said cam biased into said first position by a biasing mechanism including a rod slidably supported within said housing, biased by a spring, and in pivotal engagement with said cam; and
   a handle fixed for rotation with said cam to rotate said cam between said first and second positions.

8. The reclining seat assembly of claim 7 further comprising:
   a first plurality of teeth formed in a lower surface of said pawl; and
   a second plurality of teeth formed in an upper surface of said recliner rod, said first and second pluralities of teeth selectively engaged to prohibit relative movement between said recliner rod and said pawl.

* * * * *

UNITED STATES PATENT AND TRADEMARK OFFICE
CERTIFICATE OF CORRECTION

PATENT NO. : 6,971,720 B2
DATED : December 6, 2005
INVENTOR(S) : Jeffery T. Bonk It is certified that error appears in the above-identified patent and that said Letters Patent is hereby corrected as shown below:

<u>Title page,</u>
Item [*] Notice:, insert -- This patent is subject to a terminal disclaimer. --.

Signed and Sealed this

Twenty-eighth Day of March, 2006

JON W. DUDAS
*Director of the United States Patent and Trademark Office*